2,713,071
Patented July 12, 1955

2,713,071

TELOMERIZATION OF ETHYLENE AND SATURATED MONOHYDRIC ALCOHOLS

Michael Erchak, Jr., Morris Plains, N. J., assignor to Allied Chemical & Dye Corporation, New York, N. Y., a corporation of New York No Drawing. Application January 25, 1949,
Serial No. 72,759

7 Claims. (Cl. 260—617)

This invention relates to production of liquid to low-melting solid saturated monohydric alcoholic products, and more particularly to production of saturated monohydric alcohols having a carbon content between $C_5$ and about $C_{30}$.

An object of the invention is to produce saturated monohydric alcoholic products having carbon contents predominantly in the $C_5$–$C_{30}$ range, more particularly in the $C_5$–$C_{25}$ range, which products may be primary alcohols, secondary alcohols, tertiary alcohols or alkyl substituted alicyclic alcohols as desired.

Another object is to produce such alcohols by a simple process from readily available starting materials, namely a low molecular weight saturated monohydric alcohol, containing not more than 8 carbon atoms, and ethylene.

Other objects and advantages will appear hereinafter.

It has been proposed in the past to polymerize ethylene in the presence of a low molecular weight alcohol and an ethylene polymerization catalyst to form solid products of varying hardness having an average carbon content per molecule of about 100–300. The carbon contents of the individual molecules making up these prior products vary widely.

So far as I am aware, I am the first to discover that polymerization conditions exist under which the degree of polymerization of ethylene in presence of a low molecular weight alcohol can be very much limited, so that although polymerization chains begin, almost all, when no more than 10 to 15 ethylene molecules have combined, are stopped by addition thereto of constituent radicals of the low molecular weight alcohol which is present. Liquid to low-melting solid saturated monohydric alcoholic products of carbon content between $C_5$ and about $C_{30}$, mostly $C_5$ to $C_{25}$, are formed in accordance with my process with only small amounts of by-products.

Alcohols produced by my process are valuable for many purposes, for example in producing esters, e. g. organic and inorganic ester plasticizers, and for various other uses.

In accordance with my invention, the following conditions must be controlled:

(1) Nature and concentration of catalyst, (2) alcohol: ethylene mol ratio, (3) pressure, and (4) temperature. The permissible ranges for these conditions and the principles whereby conditions may be varied and interadjusted are discussed below.

As catalyst for my reaction, I employ hydrogen peroxide, conveniently in the form of its 30% aqueous solution. This catalyst is introduced into the reaction zone in amounts between about 0.1 part and 3 parts by weight (100% $H_2O_2$ basis) per 100 parts by weight of the low molecular weight alcohol introduced into the reaction zone. When the other variables are maintained at preferred values discussed below, amounts of catalysts corresponding to between about 0.15 and about 0.3 part by weight of 100% $H_2O_2$ introduced into the reaction zone, per 100 parts by weight of low molecular weight alcohols introduced, are sufficient to give high space-time yields of products of the desired molecular weight range. Preferably, the catalyst solution is introduced into the reaction zone separately from other constituents of the input reaction mixture. This technique facilitates bringing the reactants to reaction conditions without premature reaction and allows the hydrogen peroxide to reach reaction temperatures quickly, avoiding wasteful decomposition of catalyst.

The amount of low molecular weight alcohol to be employed in my process depends principally on the amount of ethylene present. These variables are advantageously combined in terms of mol ratio of low molecular weight alcohol:ethylene. The value for the mol ratio of low molecular weight alcohol:ethylene used in my process is at least about 1:1. Increasing the alcohol:ethylene mol ratio tends toward lowering the molecular weight of the alcohol products of reaction. Under conditions ordinarily employed, the alcohol:ethylene mol ratio does not exceed about 6:1. When otherwise preferred conditions are employed, alcohol:ethylene mol ratios between about 2:1 and 4:1 result in good space-time yields of alcohol products of carbon content substantially entirely within the $C_5$–$C_{30}$ range. These mol ratios of low molecular weight alcohol:ethylene correspond, when total pressures are in the preferred ranges discussed below, to volumes of liquid alcohol introduced into the reaction zone of roughly ½ of the available reaction space.

Pressures in the reaction vessel are controlled in accordance with my invention within the range of about 1,000 to about 5,000 pounds per square inch. Pressures below 1,000 p. s. i. result in very small space-time yields of products. The yields increase with increasing pressure but above about 5,000 p. s. i., with sufficient low molecular weight alcohol present to maintain preferred alcohol:ethylene mol ratios, the space-time yields of desired products are below the practical level. Pressures which in my process give good space-time yields of desired products under otherwise preferred conditions are from about 2,000 to about 4,000 p. s. i.

Temperature is an important variable with respect to yields of desired alcoholic products of my process. I have found that under the conditions of ethylene pressures, hydrogen peroxide concentrations and alcohol mol ratios used in my process, temperatures may be raised far above the decomposition temperature of hydrogen peroxide without uncontrollable or explosive reaction, and that use of such elevated temperatures makes possible formation of the desired alcoholic products of my process. Temperatures suitable for my process range from about 220° C. to well above 300° C. The molecular weight of the alcoholic products tends to decrease as temperature increases. At temperatures above about 280° C. the purity of the crude alcoholic products tends to decrease. Temperatures between about 220° C. and 340° C. are suitable for my process, and temperatures between about 240° C. and 280° C. are generally preferred as giving the best space-time yields of alcohols $C_5$–$C_{25}$.

The following examples illustrate production by my process of various primary, secondary and tertiary alcohol products.

The examples are intended to be illustrative only and not to limit the scope of the invention.

The procedure used in the examples was to pass commercial ethylene containing less than 0.1% by weight oxygen to a hydraulic compressor. The compressed ethylene was passed into a stainless steel autoclave of 1820 cubic centimeters capacity, which had been charged with the desired quantity of alcohol under an inert or ethylene atmosphere. The autoclave was provided with a rocker, a controlling thermocouple, a hydraulic pressure gage, and an injector for introducing catalyst solution at reaction temperature and pressure by means of ethylene at a higher pressure than that in the reaction vessel.

Reaction began when, with the charge at the desired temperature and pressure, catalyst was injected. Ethylene pressure was maintained during the ensuing reaction by intermittent ethylene additions. Reaction was continued 6 hours and the autoclave was then cooled.

The excess ethylene was bled from the cooled reactor, and unreacted starting materials and volatile constituents of the product were separated by fractionation, first at atmospheric pressure and then at reduced pressures. Constituents of the products were identified by boiling point, refractive index, elementary analysis, determination of hydroxyl number, and preparation and melting points of appropriate derivatives.

*Example 1.*—A charge of 891 cc. of technical grade methanol, 9 cc. of 30% aqueous hydrogen peroxide, and ethylene to provide a total pressure of about 3500 p. s. i. at reaction temperatures was heated at temperatures of 245 to 260° C. as described above, and then the autoclave was removed from the rocker and allowed to cool. The product, after removal of unreacted starting materials, weighed 52 grams and was identified as 85–95% alcohols, the remainder mostly saturated hydrocarbons.

By fractionation of the product at 1–2 mm. a fraction boiling up to 120° C. and a fraction boiling from 120° to 220° C. were obtained. The first fraction amounted to 49% of the total product and was identified as consisting chiefly of normal primary straight chain alcohols of the general formula $H(C_2H_4)_{2-5}CH_2OH$, i. e. they were normal primary alcohols in the $C_5$–$C_{11}$ range formed by combination of between 2 and 5 ethylene molecules with 1 methanol molecule.

The second fraction was identified as consisting chiefly of analogous $C_{11}$–$C_{21}$ alcohols and amounted to about 36% of the total product.

The residue, amounting to about 15% of the total product, was identified as containing about 70–90% alcohols, plus saturated hydrocarbons and some unsaturated compounds formed by dehydration of alcohols during the distillation process. Only small amounts of the residue were indicated to have a carbon content of above about $C_{29}$.

*Example 2.*—1100 cc. of methanol and 45 cc. of 30% aqueous hydrogen peroxide solution were heated in the autoclave to about 250° C. under ethylene pressure of about 3800 p. s. i., as described above except that the hydrogen peroxide was dissolved in the methanol and not injected separately. The yield of reaction products was 58 grams, largely primary alcohols. The $C_5$–$C_{11}$ alcohols were 50% by weight of the product; $C_{11}$–$C_{21}$ alcohols were 42%; and residue was 8%.

*Example 3.*—When 891 cc. of 95% ethanol were substituted for the methanol in the procedure of Example 1, the yield of products after removing unreacted starting material was 87 grams. The major proportion of these products was identified as consisting of secondary alcohols of the general formula $H(C_2H_4)_nCH(OH)CH_3$. About 41% of the product had a carbon content of about $C_{10}$ or below and about 37% was $C_{12}$–$C_{20}$, leaving about 22% with carbon content above $C_{20}$.

Products identified as secondary alcohols were similarly formed from normal propyl, normal butyl, isobutyl, and normal amyl alcohols. Normal octyl alcohols plus ethylene reacted similarly except that about 50% of the product had carbon content above $C_{21}$.

*Example 4.*—When 895.5 cc. of isopropyl alcohol were heated as in Example 1 above at 245–260° C. with 4.5 cc. of 30% aqueous hydrogen peroxide plus ethylene to provide a total pressure at reaction temperatures of about 3500 p. s. i., 121 grams of products freed of unreacted starting materials were obtained. The products were identified as consisting chiefly of tertiary alcohols of the general formula $H(C_2H_4)_nC(OH)(CH_3)_2$. The approximate carbon contents of these products were: less than $C_{11}$—60% $C_{11-21}$—29%; over $C_{21}$—11%.

Secondary butyl alcohol when substituted for isopropanol in the procedure of Example 4 gave 79 grams of products freed of starting materials, of which about 32% had carbon content below about $C_{11}$; about 38% had carbon content, $C_{11}$–$C_{21}$; and the remaining 30% had carbon content above about $C_{21}$. These products were likewise identified as tertiary alcohols.

*Example 5.*—900 cc. of cyclohexanol plus 18 cc. of 30% aqueous hydrogen peroxide plus ethylene to provide a pressure of about 3500 p. s. i. at reaction temperatures were heated as in Example 2 above at about 275° C. for 18 hours. The products, after separation of unreacted starting materials and dehydrogenation products such as cyclohexanone, weighed about 223 grams. They were identified as chiefly cyclic alcohols of the general formula $H(C_2H_4)_nC(OH)<(CH_2)_5$. About 75% of the product had carbon content below $C_{28}$.

Other low molecular weight saturated monohydric alcohols of carbon content not greater than $C_8$ which have been reacted with ethylene by the general procedure of the above examples to form predominantly alcohols of carbon content between $C_5$ and $C_{30}$ are isobutyl alcohol and tertiary butyl alcohol. A preferred group of alcohols, all of which give high yields of useful products, are the primary saturated monohydric alcohols containing 1–4 carbon atoms in the molecule.

The reactants used in my process may be commercial products and need not be specially purified, except that if the ethylene contains appreciable amounts of oxygen as an impurity—say more than about 1000 parts per million by weight—it is desirable to reduce the oxygen content to less than 1000 parts per million since better yields of products are then obtained. Other impurities which may be present in commercial ethylene, such as ethane, propylene, and so on, have relatively small influence on the process of my invention; but desirably the total of these other impurities is kept below about 30%, preferably below 5% by volume of the ethylene for best yields of the desired products.

It is desirable to have a small amount of water present in the reaction mixture since yields of products generally increase with increasing concentrations of water up to about 5–10 parts by weight of water per 100 parts of alcohol. The yields of products decrease, however, above about 10 parts of water and the proportion of product of carbon content above $C_{21}$ increases. Hence, desirably the amount of water is maintained at not more than about 10 parts by weight per 100 parts of low molecular weight alcohol reactant introduced into the reaction zone. A suitable quantity of water is introduced when 30% aqueous hydrogen peroxide is employed as reaction catalyst in accordance with my process.

Other construction materials besides the stainless steel referred to above may be used, including cold rolled steel.

The reactants in my process should be in intimate contact. When reaction temperatures are above the critical temperature of the reaction mixture, no special precautions are required to obtain intermixture of the reactants. But when two phases are present agitation is desirable to maintain the proper contact between the reactants.

Although batch operation is described in the foregoing examples, semi-continuous or continuous operations may advantageously be employed instead by use of suitable equipment for receiving the reactants and discharging the products and any unreacted starting materials.

I claim:

1. A process for obtaining from ethylene and a low molecular weight saturated monohydric alcohol containing not more than 8 carbon atoms, a liquid saturated alcoholic product predominantly of carbon content $C_5$–$C_{30}$ which process comprises maintaining ethylene in intimate contact with said low molecular weight alcohol under pressures between about 1,000 and about 5,000 pounds per square inch, at temperatures between about 220° C. and about 340° C., with a mol ratio of low molecular weight alcohol : ethylene of about 1:1–6:1 and in presence of hydrogen peroxide catalyst introduced into the reaction zone in amounts of about 0.1–3 parts by weight based on 100% $H_2O_2$ per 100 parts of the low molecular weight alcohol introduced into the reaction zone.

2. A process as defined in claim 1 in which reactants are brought to reaction conditions and with the charge at the desired temperature and pressure the catalyst is introduced into the reaction zone separately from other constituents of the input reaction mixture.

3. A process as defined in claim 2, in which said low molecular weight alcohol is a primary alcohol containing 1–4 carbon atoms in the molecule.

4. A process as defined in claim 3 in which the pressure is between 2,000 and 4,000 pounds per square inch, the reaction temperatures are between 240° and 280° C., the mol ratio of low molecular weight alcohol : ethylene is between about 2:1 and 4:1, and aqueous hydrogen peroxide is introduced separately from other constituents of the input reaction mixture into the reaction zone in amounts between about 0.15 and about 0.3 parts by weight based on 100% $H_2O_2$ per 100 parts of low molecular weight alcohol introduced into the reaction zone; and the water present amounts to not more than about 10 parts by weight of water per 100 parts of low molecular weight alcohol introduced into the reaction zone.

5. A process as defined in claim 4 in which said low molecular weight alcohol is methanol.

6. A process as defined in claim 4 in which said low molecular weight alcohol is ethanol.

7. A process as defined in claim 4 in which said low molecular weight alcohol is isopropanol.

References Cited in the file of this patent

UNITED STATES PATENTS

| | | |
|---|---|---|
| 2,402,137 | Hanford et al. | June 18, 1946 |
| 2,409,683 | Howk et al. | Oct. 22, 1946 |
| 2,411,158 | Hanford | Nov. 19, 1946 |
| 2,432,287 | Cramer | Dec. 9, 1947 |
| 2,440,801 | Hanford et al. | May 4, 1948 |
| 2,495,286 | Brubaker | Jan. 24, 1950 |